US00RE38486E

(19) United States
(12) Reissued Patent
Sakabe

(10) Patent Number: US RE38,486 E
(45) Date of Reissued Patent: Apr. 6, 2004

(54) ELECTRIC MOTOR CONTROL CIRCUIT

(75) Inventor: Ichio Sakabe, Aichi-ken (JP)

(73) Assignee: Makita Corporation, Anjo (JP)

(21) Appl. No.: 10/051,224

(22) Filed: Jan. 15, 2002

Related U.S. Patent Documents

Reissue of:
(64) Patent No.: 6,060,850
Issued: May 9, 2000
Appl. No.: 09/034,347
Filed: Mar. 4, 1998

(30) Foreign Application Priority Data

Mar. 4, 1997 (JP) ..... 9-067410

(51) Int. Cl.[7] ..... H02P 7/00; H02K 17/32
(52) U.S. Cl. ..... 318/434; 318/799; 388/903; 388/813
(58) Field of Search ..... 318/432–434, 318/772–812; 388/800–824, 903, 915, 910

(56) References Cited

U.S. PATENT DOCUMENTS

| | | | | |
|---|---|---|---|---|
| 4,095,072 A | * | 6/1978 | Piber | 200/157 |
| 4,316,129 A | | 2/1982 | Shapiro et al. | 318/313 |
| 4,414,500 A | | 11/1983 | Schneider | 318/799 |
| 4,734,629 A | | 3/1988 | Lessig, III et al. | 318/332 |
| 5,526,460 A | * | 6/1996 | DeFrancesco et al. | 388/831 |
| 5,760,553 A | | 6/1998 | Astic et al. | 318/244 |
| 6,424,112 B1 | * | 7/2002 | Schauer | 318/599 |

FOREIGN PATENT DOCUMENTS

| | | | |
|---|---|---|---|
| DE | 2622656 C2 | 9/1982 | H02P/5/00 |
| DE | 3519840 C2 | 5/1991 | H02P/5/00 |
| DE | 3429427 C2 | 7/1991 | H02P/5/00 |
| DE | 4407634 A1 | 9/1995 | H02P/5/00 |

* cited by examiner

*Primary Examiner*—Robert E. Nappi
*Assistant Examiner*—Rina I. Duda
(74) *Attorney, Agent, or Firm*—Orrick Herrington & Sutcliffe LLP

(57) ABSTRACT

An electric motor control circuit that prevents lowering of a motor's rotation speed when a load is applied in the case where a rotation speed is adjusted within a range that doesn't exceed a predetermined upper limit of rotation speed. When a base current of a transistor Q1 starts to flow in response to operation of a trigger switch 3, transistor Q1 turns on and a setting signal output from a switch S2 which sets the upper limit rotation of a motor M is bypassed via a bypass way 22 by transistor Q1. Thus, a signal level of the setting signal inputted to an operational amplifier 7 is changed, and output timing of a pulse signal output from a phase control circuit 5 to a gate pulse output circuit 9 is changed and a conducting angle of a triac Q2 is controlled. Because the trigger switch 3 does not adjust an output level of operational amplifier 7, the rotation speed of motor M does not decrease when the load is applied.

32 Claims, 8 Drawing Sheets

ELECTRIC MOTOR CONTROL CIRCUIT

Matter enclosed in heavy brackets [ ] appears in the original patent but forms no part of this reissue specification; matter printed in italics indicates the additions made by reissue.

*This application is a reissue of U.S. Pat. No. 6,060,850, issued on May 9, 2000.*

BACKGROUND OF THE INVENTION

1. Field of Invention

This invention relates generally to electric motor control circuits. More specifically, the invention relates to electric motor control circuits which set an upper limit on the rotation speed of electric motors and adjust the rotation speed within the set upper limit.

2. Description of Related Art

It is known to provide an electric motor control circuit which sets an upper limit on the rotation speed of an electric motor and adjusts the rotation speed within the upper limit. In this regard see U.S. Pat. No. 4,734,629, the teachings of which are incorporated herein by reference as if fully set forth, and the concept of which is explained in FIGS. 6 and 7.

FIG. 6 is a schematic diagram of the configuration of a known electric motor control circuit. FIG. 7 is a schematic diagram of a part of the electric motor control circuit shown in FIG. 6.

This known electric motor control circuit has a triac Q7 for controlling a voltage applied to motor M from an interchange power supply 50. A transistor Q6 provides gate pulse signals to triac Q7. A tachometer-generator TG detects the rotation speed of the motor M. An upper limit rotation speed setter S10 (see FIG. 7) sets the upper limit of rotation speed of the motor M. A trigger switch S9 adjusts the rotation speed of the motor M within a range having the upper limit. A phase control IC 60 controls a gate pulse signal outputting timing from transistor Q6.

The signal indicative of rotation speed of the motor M detected by tachometer-generator TG is input to a terminal P30, and converted into a voltage signal corresponding to the rotation speed of the motor M via a frequency/voltage converter 61 (refer to FIG. 7). A signal indicative of the upper limit of rotation speed output from setter S10 is input to a terminal P31. The voltage of both signals are compared by an operational amplifier 62 built in phase control IC 60, and a pulse signal indicative of this comparative result is input to a pulse timing setting circuit 63. A sawtooth signal which synchronizes with the interchange power supply 50 is input to the pulse timing setting circuit 63 via a terminal P41, and an agreement point of the voltage of this sawtooth signal and the voltage of the pulse signal is detected.

At the detected agreement point, an operation signal is output from the pulse timing setting circuit 63 to transistor Q6 via terminal P39. A gate pulse signal (trigger current) is output to triac Q7 from transistor Q6, and triac Q7 turns on, and the phase of the voltage applied to motor M is controlled.

Phase control IC 60 watches the rotation speed of motor M and controls the phase of the voltage applied to motor M to maintain the upper limit rotation speed set by setter S10.

The output of operational amplifier 62 is connected to trigger switch S9 via a terminal P34 and a transistor Q5. The voltage level of the output signal of operational amplifier 62 is changed by operating this trigger switch S9.

By operating trigger switch S9, the output timing of the pulse signal in the pulse timing setting circuit 63 is adjusted, and, the rotation speed of the motor M is adjusted within the range that the rotation speed doesn't exceed the upper limit rotation number.

In this known electric motor control circuit, however, trigger switch S9 is connected to the output side of the operational amplifier 62 as shown in FIG. 7. The output level of the operational amplifier 62 is adjusted directly by the trigger switch S9. Accordingly, even if the rotation speed of the motor M decreases due to a load and the decreased number is detected by operational amplifier 62, the rotation speed of the motor M can't be increased because the output of operational amplifier 62 is lowered by trigger switch S9.

That is, as shown in FIG. 8 showing a relationship between a load applied to motor M and the rotation speed of motor M controlled by the existing control circuit, if trigger switch S9 is set to the maximum stroke and the rotation speed reaches the upper limit rotation number, the rotation speed of motor M is not slowed by a certain load because the output level of operational amplifier 62 does not increase. Whereas the rotation speed is slowed by a load until the rotation speed reaches the upper limit rotation.

Specially, in an electromotive tool such as a sander and a polisher, because required rotation speeds of the motor are different due to finishing stages and polished parts, the rotation speed of the motor is changed frequently. In the above mentioned existing circuit, unless the stroke of the trigger is made longer, the rotation speed of the motor falls when a pad for grinding is put on a grinding side. When the rotation speed of the motor is changed, an established value of the upper limit rotation speed setter S10 must be adjusted, which is inconvenient. Moreover, it is desirable that the rotation speed of the motor can be changed by adjusting the stroke of the trigger, because delicate finishing is carried out with delicately changing the rotation speed of the motor in the grinding operation.

SUMMARY OF THE INVENTION

It is accordingly an object of the present invention to provide an electric motor control circuit which can prevent lowering of the rotation speed of a motor when a load is applied in the case where rotation speed is adjusted within a range that doesn't exceed a predetermined upper limit.

This invention provides an electric motor control circuit meeting this objective. The electric motor control circuit has: an electric motor driven by an interchange power supply, a semiconductor control element having a gate that conducts when a pulse signal is applied to the gate and which causes, in turn, a voltage supplied from the interchange power supply to be applied to the electric motor. A pulse signal output means outputs the pulse signal to the semiconductor control element. A rotation speed detection means detects the rotation speed of the electric motor. An upper limit rotation speed setting means sets an upper limit for the rotation speed of the electric motor. A rotation speed adjustment means adjusts the rotation speed of the electric motor within a range that doesn't exceed the upper limit rotation speed set by the upper limit rotation speed setting means. Comparative means compares a setting signal indicative of the upper limit rotation speed output from the upper limit rotation speed setting means with a detecting signal indicative of the rotation speed of the electric motor detected by the rotation speed detection means, and outputs a comparative signal which shows a comparative result of both signals. Output timing control means controls an output timing of the pulse signal output means based on the comparative signal output from the comparative means. The rotation speed setting means adjusts a signal level of the setting signal output from the upper limit rotation speed setting means.

The comparative means compares the setting signal which indicates the upper limit rotation speed output from the upper limit rotation speed setting means with the detecting signal which indicates the rotation speed of the electric motor detected by the rotation speed detection means, and outputs the comparative signal which shows the comparative result of both signals. The output timing control means controls the output timing of the pulse signal of the pulse signal output means based on the comparative signal output from the comparative means.

In other words, the comparative means detects the difference between a feed-back rotation speed of the motor and the upper limit rotation speed set up by the upper limit rotation speed setting means. And the output timing control means adjusts the rotation speed of the motor to maintain the upper limit rotation number, based on the detected difference.

Because the rotation speed setting means adjusts the signal level of the setting signal output from the upper limit rotation speed setting means, and the comparative means compares the setting signal of which the signal level is adjusted by the rotation speed setting means with the detecting signal showing the rotation speed of the motor. The rotation speed of the electric motor is maintained in the rotation speed shown by the setting signal of which the signal level is adjusted.

Because the level of the comparative signal output from the comparative means isn't adjusted, the function of the comparative means and the output timing control means which maintains the rotation speed of the electric motor isn't lost.

The setting signal output from the upper limit rotation speed setting means is adjusted, thus the rotation speed of the electric motor never exceeds the upper limit rotation speed by the adjusted level of the setting signal.

In one preferred embodiment, the rotation speed adjustment means has a variable resistor, and a transistor having a base connected to the variable resistor which controls the setting signal. The transistor can be used as a switch for the rotation speed adjustment. Since the transistor turns on, the signal level of the setting signal is adjusted so that the rotation speed of the electric motor can be adjusted within the range which doesn't exceed the upper limit of rotation speed.

In another preferred embodiment, the electric motor control circuit has a delay circuit which gradually increases a base voltage applied to the transistor. Because of the delay circuit, rapid change in the base voltage is prevented when the adjustment of the rotation speed of the electric motor is started by the rotation speed adjustment means. Therefore, any sudden change of the signal level of the setting signal and any sudden increase of the rotation speed of the electric motor is prevented.

In another preferred embodiment, the electric motor control circuit has switching means for switching a voltage applied to the variable resistor between a voltage supplied to the upper limit rotation speed setting means and a voltage set up by the upper limit rotation speed setting means. In the case where the switch means switches the voltage applied to the variable resistor to the voltage supplied to the upper limit rotation speed setting means, the voltage applied to the variable resistor is changed within the voltage supplied to the upper limit rotation speed setting means. In the case where the switch means switches the voltage applied to the variable resistor to the voltage set up by the upper limit rotation speed setting means, the voltage applied to the variable resistor is changed within the voltage set up by the upper limit rotation speed setting means.

For example, it will be mentioned later, by connecting a switch S4 corresponding to the switching means to a terminal P20, the voltage applied to a trigger switch S3 corresponding to the variable resistor is switched to the voltage supplied to a dial switch S2 corresponding to the upper limit rotation speed setting means. By connecting the switch S4 corresponding to the switching means to a terminal P19, the voltage applied to a trigger switch S3 is switched to a voltage set up by dial switch S2.

In the case where the switch S4 is connected to the terminal P20, it will be understood with reference to FIG. 2(B) which shows relation between the rotation speed N of the motor M and a stroke L of the trigger switch S3, for example, when the upper limit rotation speed is set up in a level 4, until the stroke L of the trigger switch S3 becomes L4, the rotation speed N of the motor M linearly rises, and when the stroke L of the trigger switch S3 exceeds L4, the rotation speed becomes constant. In the case where the switch S4 is connected to the terminal P19, the rotation speed of the motor M linearly rises in proportion to the stroke L of the trigger switch S3 as shown in FIG. 5(B).

In other words, rising patterns of the rotation speed of the motor M can be changed by operating the switch S4.

BRIEF DESCRIPTION OF THE DRAWINGS

The present invention is illustrated in the accompany drawings, in which.

DETAILED DESCRIPTION OF THE PREFERRED EMBODIMENTS

Embodiments of this invention will now be described in detail with reference to the accompanying drawings.

Figure 1:
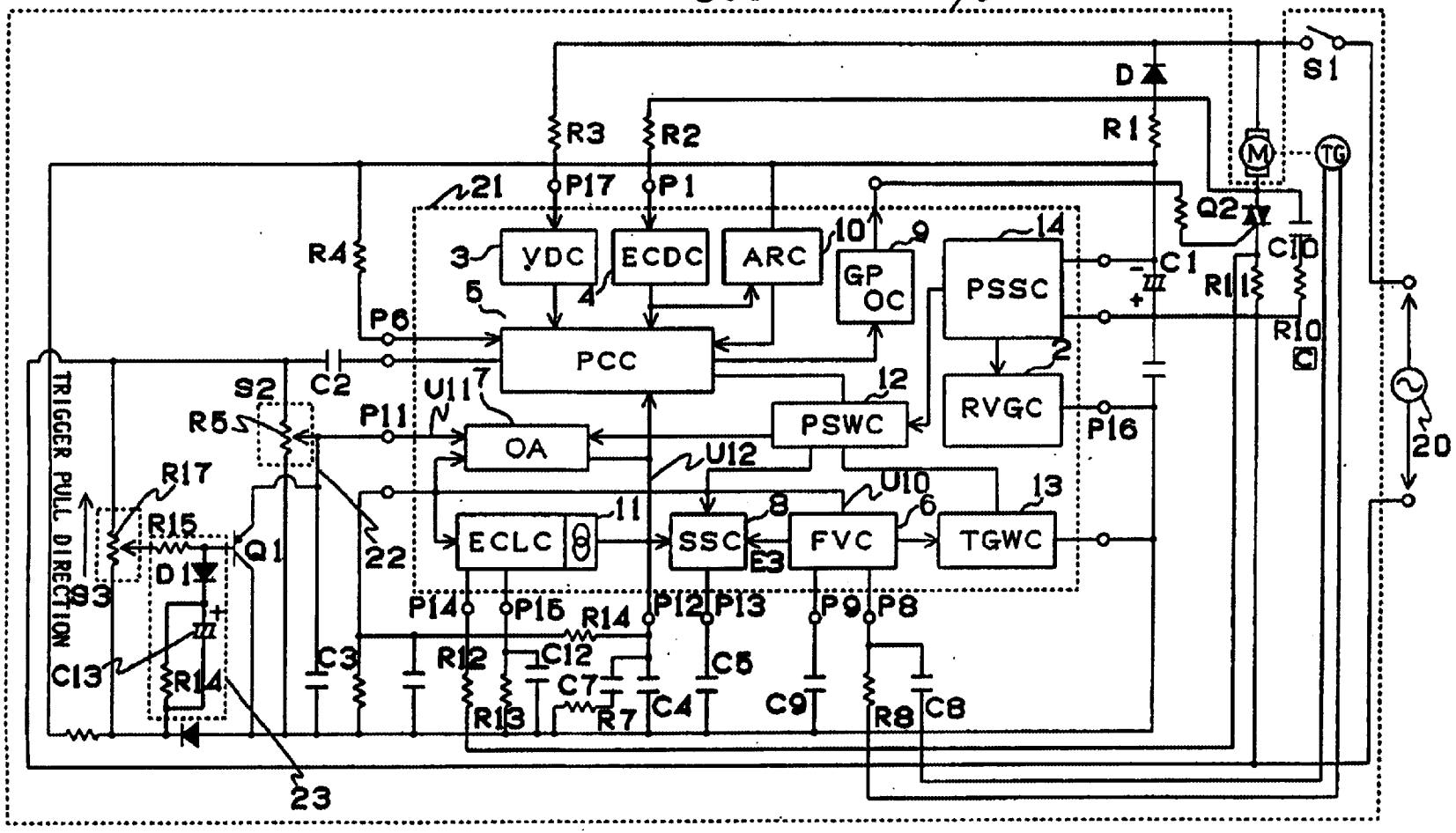
FIG. 1 is an electric circuit diagram showing an electric motor control circuit according to a first embodiment of the present invention.

FIG. 1 is an electric circuit diagram showing an electric motor control circuit according to a first embodiment of the invention. An electric motor control circuit of an interchange commutator motor (hereafter referred as a motor), used for an electromotive tool will be explained as a representative.

The electric motor control circuit 1 has a main switch S1. A triac Q2 is a semiconductor control element which controls an interchange voltage supplied from an interchange power supply 20. An integrated circuit IC 21 provides control of a motor M including: rotation speed, soft start and automatic re-trigger. A tachometer-generator TG detects the rotation speed of motor M and outputs a signal having a frequency representing the rotation speed. A dial switch S2 provides a user with the ability to set an upper limit of the motor's rotation speed. Dial switch S2 is part of a so-called "upper limit rotation speed setting means." A trigger switch S3 allows the user to adjust the rotation speed within an allowable range, bounded by the upper limit. Trigger switch S3 is part of a so-called "rotation speed adjustment means".

The triac Q2 is connected in parallel with a series circuit including a movement stability capacitor C10 and a resistor R10. In this embodiment, IC 21 can be a U209B3- (FP), U211B2, or U211B3 of the German AEGTELEFUNKEN Co. or an equivalent thereto.

The IC 21 has a power supply stabilization circuit 14 which supplies power to IC 21; a reference voltage generation circuit 2; a voltage detection circuit 3 which detects the voltage applied to motor M; an electric current detection circuit 4 which detects a current flowing through motor M; a gate pulse output circuit 9 which outputs a gate pulse signal to triac Q2; a phase control circuit 5, serving as an output timing control means which controls an output timing of the gate pulse signal output from the gate pulse output circuit 9 to control a phase of the voltage applied to motor M; a frequency/voltage converter 6 which inputs an signal output from tachometer-generator TG and converts the signal into a signal having a voltage representing the frequency of the signal output from tachometer-generator TG; an operational amplifier 7; a soft start circuit 8; an automatic re-trigger circuit 10 which corrects any mis-trigger; an electric current limit circuit 11; a power supply watch circuit 12 which watches a movement condition of the power supply stabilization circuit 14; and a tachometer-generator watch circuit 13 which watches a movement condition of the tachometer-generator TG.

The electric current detection circuit 4 prevents an output of the gate pulse signal to the gate of the triac Q2 from the gate pulse output circuit 9 until electric current passes through zeros of the interchange, because the load of triac Q2 is inductive and the electric current is delayed with respect to voltage. An output E3 of frequency/voltage converter 6 is supplied to soft start circuit 8 and controls the electric charge of the capacitor C5 connected to a terminal P13. Soft start circuit 8 prevents rapidly starting rotation when trigger switch S3 is pulled. The electric current limit circuit 11 detects the voltage across both ends of resistor R11 when load electric currents increased drastically, and pulls electric current from the terminal P12 to decrease a voltage U12 so as to decrease the voltage applied to motor M rapidly, after a delay time determined by the values of a resistor R13 and a capacitor C12.

Terminals P1, P17, P6, P14 of IC 21 are connected to resistors R2, R3, R4, R12, respectively. Terminal P9 is connected to a capacitor C9. A terminal P15 is connected in series to a parallel circuit including resistor R13 and capacitor C12. Terminal P12 is connected to a parallel circuit. The parallel circuit includes a series circuit of capacitor C7 and a resistor R7 in parallel with capacitor C4. A terminal P8 is connected to a parallel circuit including resistor RS and a capacitor C8.

Dial switch S2 is a variable resistor which changes the resistance of resistor R5 by turning a dial-shaped member (not illustrated). An output of the dial switch is connected to one input terminal of the operational amplifier 7 via a terminal P11. A bypass 22 is connected between terminal P11 and dial switch S2. A capacitor C3 is connected to bypass way 22. An emitter of transistor Q1 is connected to bypass way 22, and a base of the transistor Q1 is coupled to trigger switch S3. An anode of a diode D1 is connected between trigger switch S3 and the base of transistor Q1. A cathode of diode D1 is connected to a time constant circuit 23. Time constant circuit 23 includes, in series with diode D1, a parallel circuit of resistor R14 and capacitor C13. A resistor R15 couples the base of Q1 with the wiper of switch S3. Switch S3 has a trigger (not shown) which is installed in an electromotive tool, to allow a user to change the resistance of variable resistor R17 based on trigger pull. A voltage is applied across resistor R17 that is the same as that which is applied across resistor R5 of dial switch S2.

The operation of electric motor control circuit 1 will now be explained. When a person using the electromotive tool sets up the requested upper limit of rotation speed by operating dial switch S2 and turns on the main switch S1, the interchange electric current supplied from interchange power supply 20 is half-wave rectified by a capacitor C1, a resistor R1 and a diode D. A direct current voltage is supplied to the power supply stabilization circuit 14 by the half-wave rectified electric current. A reference voltage is supplied to terminal P16 of the reference voltage generation circuit 2. The voltage detection circuit 3 inputs a sawtooth signal into to IC 21. This sawtooth signal has an inclination determined by a time constant of resistor R4 and capacitor C2 and is synchronized with the interchange power supply 20.

When the trigger is hardly being pulled, because the base voltage of the transistor Q1 is lower than the setting signal output to the operational amplifier 7 from the dial switch S2, the setting signal is bypassed into bypass way 22. And the bypassed electric current flows through the emitter of transistor Q1. Therefore, the signal level of the setting signal is lowered.

The rotation speed of the motor M is detected by tachometer-generator TG. The detection signal, corresponding to rotation speed, is input to frequency/voltage converter 6 from the tachometer-generator TG through terminal P8. The input detection signal is converted into a signal having a voltage corresponding to the frequency of the signal from tachometer-generator TG by frequency/voltage converter 6. The voltage U10 of this converted signal is provided to operational amplifier 7. A voltage U11, set by dial switch S2, is provided to operational amplifier 7. Operational amplifier 7 compares voltage U10 and voltage U11, and outputs a voltage U12 indicative of the comparative result. Voltage U12 is compared with the voltage of the above mentioned sawtooth signal by phase control circuit 5, in the agreement point of both voltages, gate pulse signal is output to the triac Q2 from the gate pulse output circuit 9. The triac Q2 turns on to rotate motor M.

Then, when the trigger is further pulled, the base voltage of the transistor Q1 increases gradually and the electric current bypassed by bypass way 22 decreases. The voltages U11 of switch S2 increases. This causes a change in the voltage output voltage U12 of the operational amplifier 7, the agreement point of the voltage and the above sawtooth signal is changed, and a gate pulse signal is output to the triac Q2 from the gate pulse output circuit 9 in the changed agreement point, the conducting angle of triac Q2 changes, and the rotation speed of motor M rises.

In other words, the rotation speed of the motor M is fed back to IC 21, motor M rotates at the rotation speed adjusted by trigger switch S3, i.e., by the rotation speed corresponding the stroke of which the trigger is pulled.

Then, when the pulled stroke of the trigger switch S3 has reached a certain length, transistor Q1 turns off, and the setting signal is not bypassed by transistor Q1. Therefore, the rotation speed of the motor M is decided by the signal set by dial switch S2.

Figure 2A:
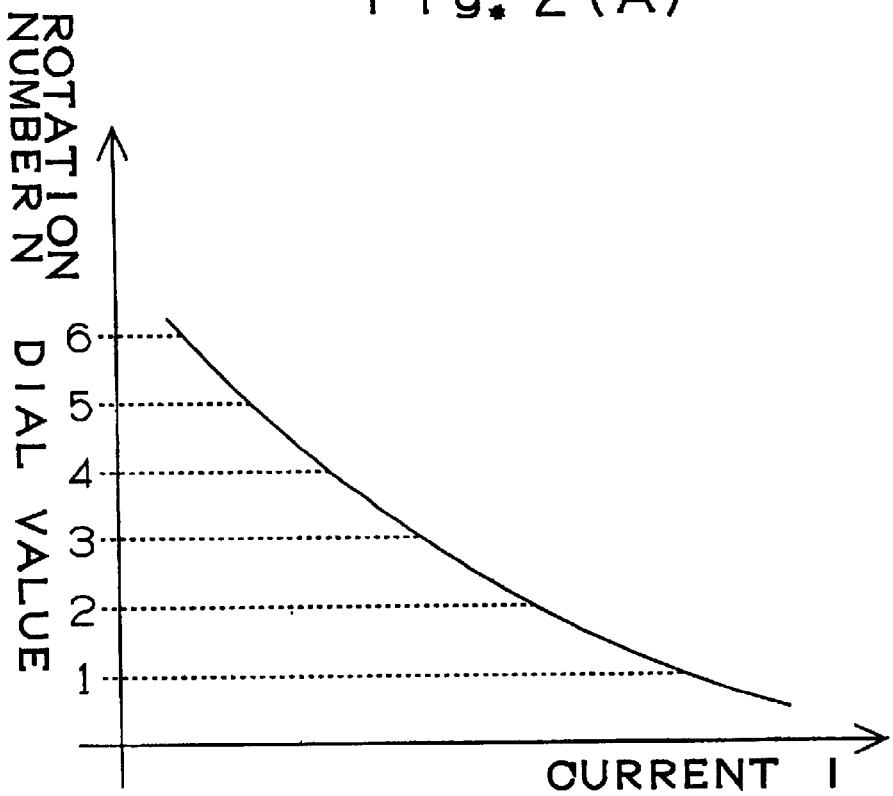
FIG. 2(A) is a graph showing the relation between an electric current flowing through a motor and a rotation speed of the motor in the electric motor control circuit of the first embodiment.
Figure 2B:
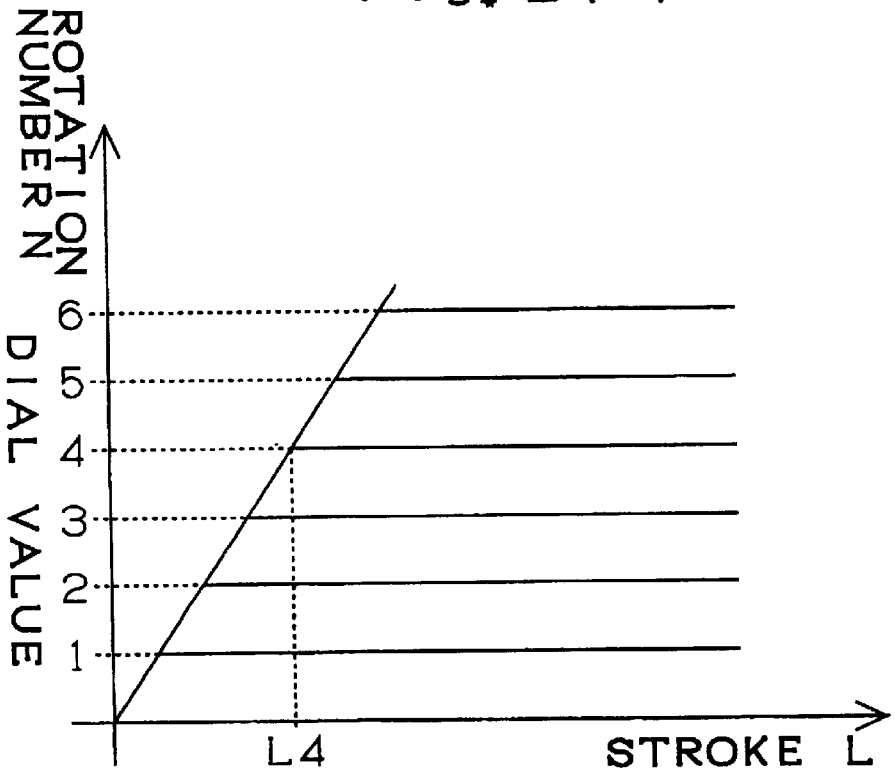
FIG. 2(B) is a graph showing the relation between a stroke of the trigger and the rotation speed of the motor in the electric motor control circuit of the first embodiment.

FIGS. 2(A), 2(B) show the results of operating electric motor control circuit 1 according to the first embodiment. FIG. 2(A) is a graph showing the relation between a rotation speed N of the motor M and an electric current I flowing through motor M. FIG. 2(B) is a graph showing the relation between the rotation speed N of the motor M and the stroke L of the trigger.

As shown in FIGS. 2(A), 2(B), it is understood that, at each upper limit rotation speed set up by the dial switch S2, the rotation speed of the motor M becomes constant when the stroke of the trigger exceeds fixed values. For example, until the stroke of the trigger becomes L4, the rotation speed N of the motor X rises in proportion to the stroke L, when the stroke L of the trigger exceeds L4, the rotation speed N of motor M becomes constant.

Trigger switch S3 controls the voltage of the setting signal output from switch S2 which is an input to operational amplifier 7, but it does not alone control the output of operational amplifier 7. Thus, a function which maintains the rotation speed of the motor M at the adjusted rotation speed of the motor M by operational amplifier 7 and phase control circuit 5 isn't lost.

Even if a load is applied to motor M, the rotation speed of the motor M does not decrease. Especially, when control circuit 1 of the first embodiment is utilized in an electromotive tool such as a sander or a polisher, because the rotation of the motor doesn't fall even if a pad for grinding is pressed down to a grinding side with a certain power in grinding work, working efficiency can be improved.

In the case where the base voltage of the transistor Q1 increases suddenly when the trigger is pulled, the voltage U11 increases, a big torque suddenly occurs in the motor M and the electromotive tool shakes. The electric motor control circuit 1 however can gradually increase the base voltages by time constant circuit 23 and can slowly raise the rotation speed of motor M when the trigger is pulled.

Figure 3:
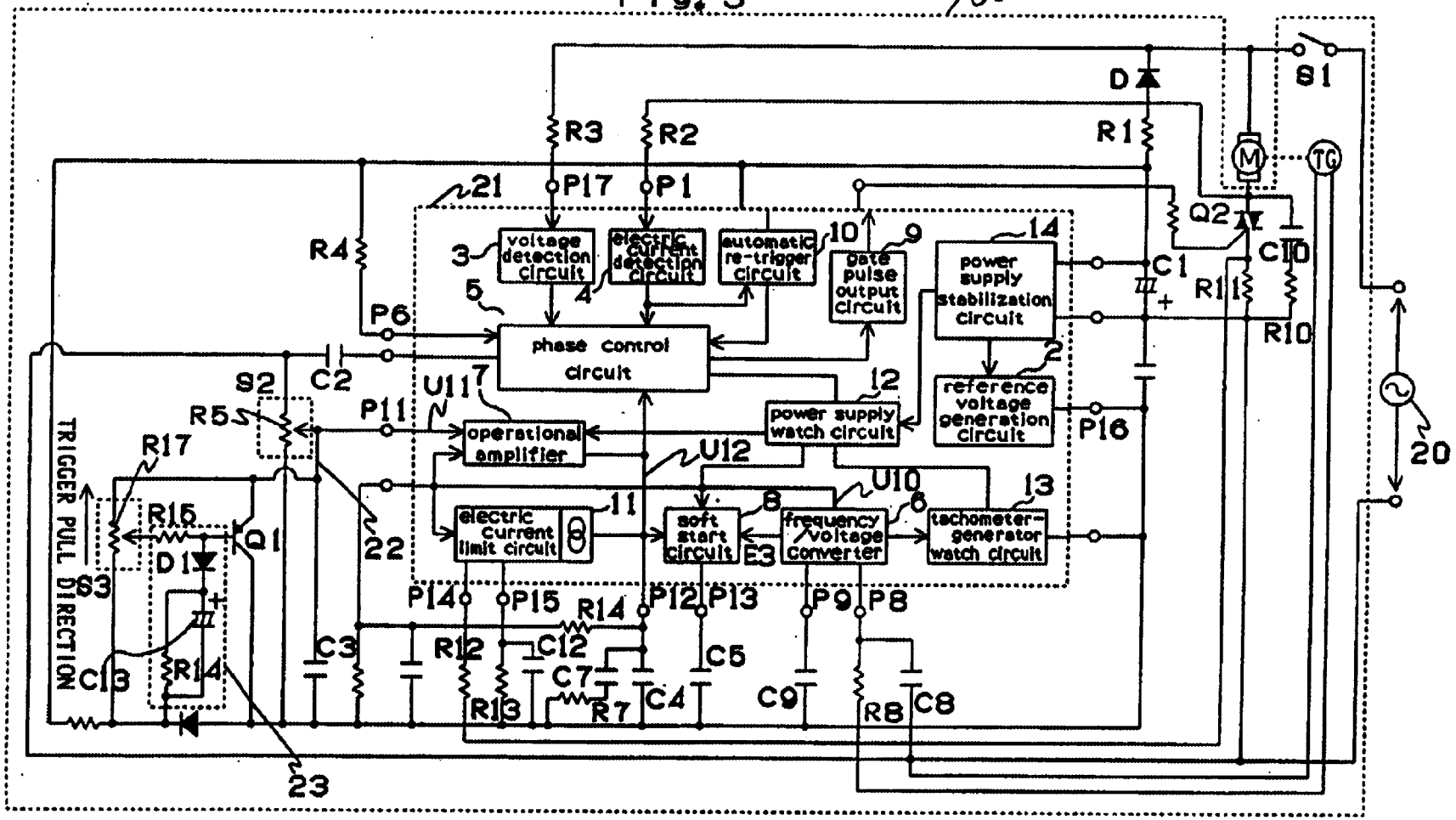
FIG. 3 is an electric circuit diagram of an electric motor control circuit according to a second embodiment of the present invention.

A electric motor control circuit according to a second embodiment of the present invention will now be explained with reference to FIG. 3 showing an electric circuit diagram thereof.

The electric motor control circuit of the second embodiment can linearly increase the rotation speed of a motor M in proportion to the stroke of the trigger. In this second embodiment, shown in FIG. 3, switch S3 is wired differently than in the first embodiment. In this embodiment, one end of trigger switch S3 is connected to bypass way 22 rather than to the top of switch S2 as in the first embodiment. Switches S2 and S3 are arranged such that by operating trigger switch S3, a level of a setting signal output from dial switch S2 can be adjusted from the minimum value to the maximum value.

Figure 5A:
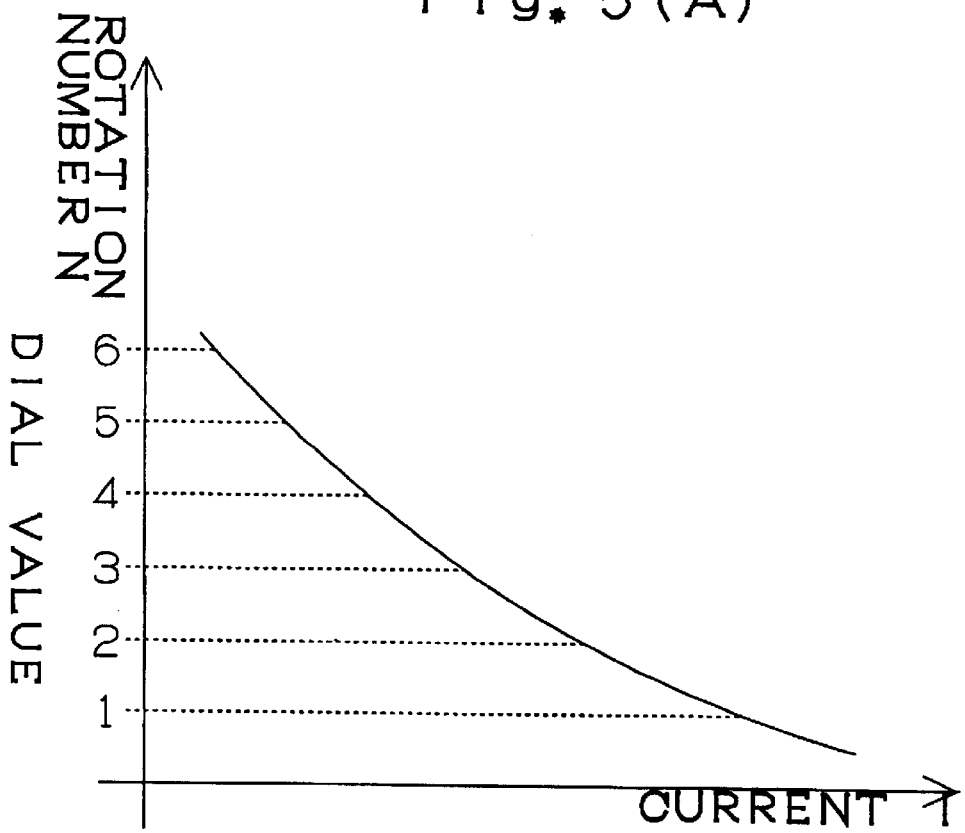
FIG. 5(A) is a graph showing the relation between an electric current flowing through a motor and a rotation speed of the motor in the electric motor control circuit of the second embodiment.
Figure 5B:
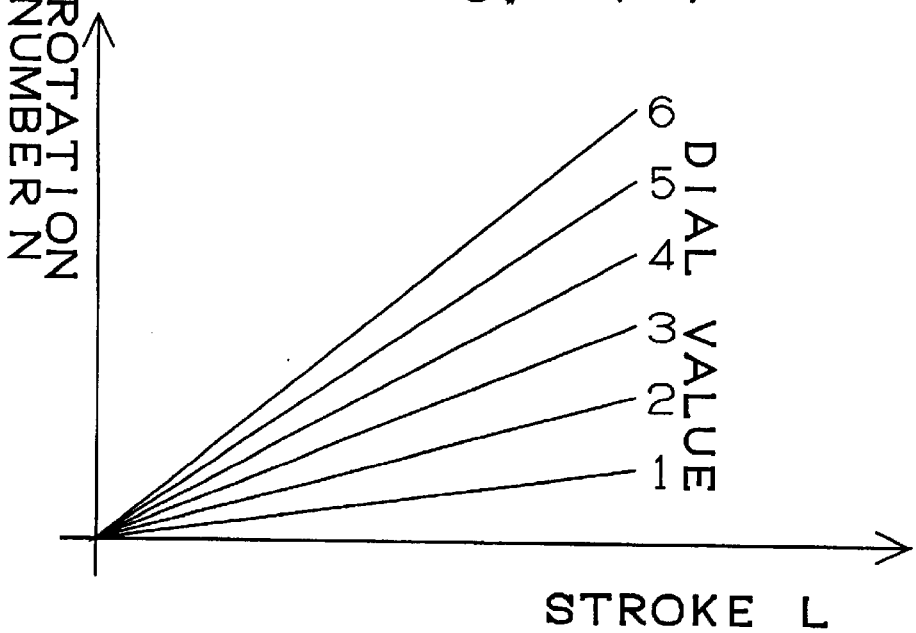
FIG. 5(B) is a graph showing the relation between a stroke of the trigger and the rotation speed of the motor in the electric motor control circuit of the second embodiment.
Figure 6:
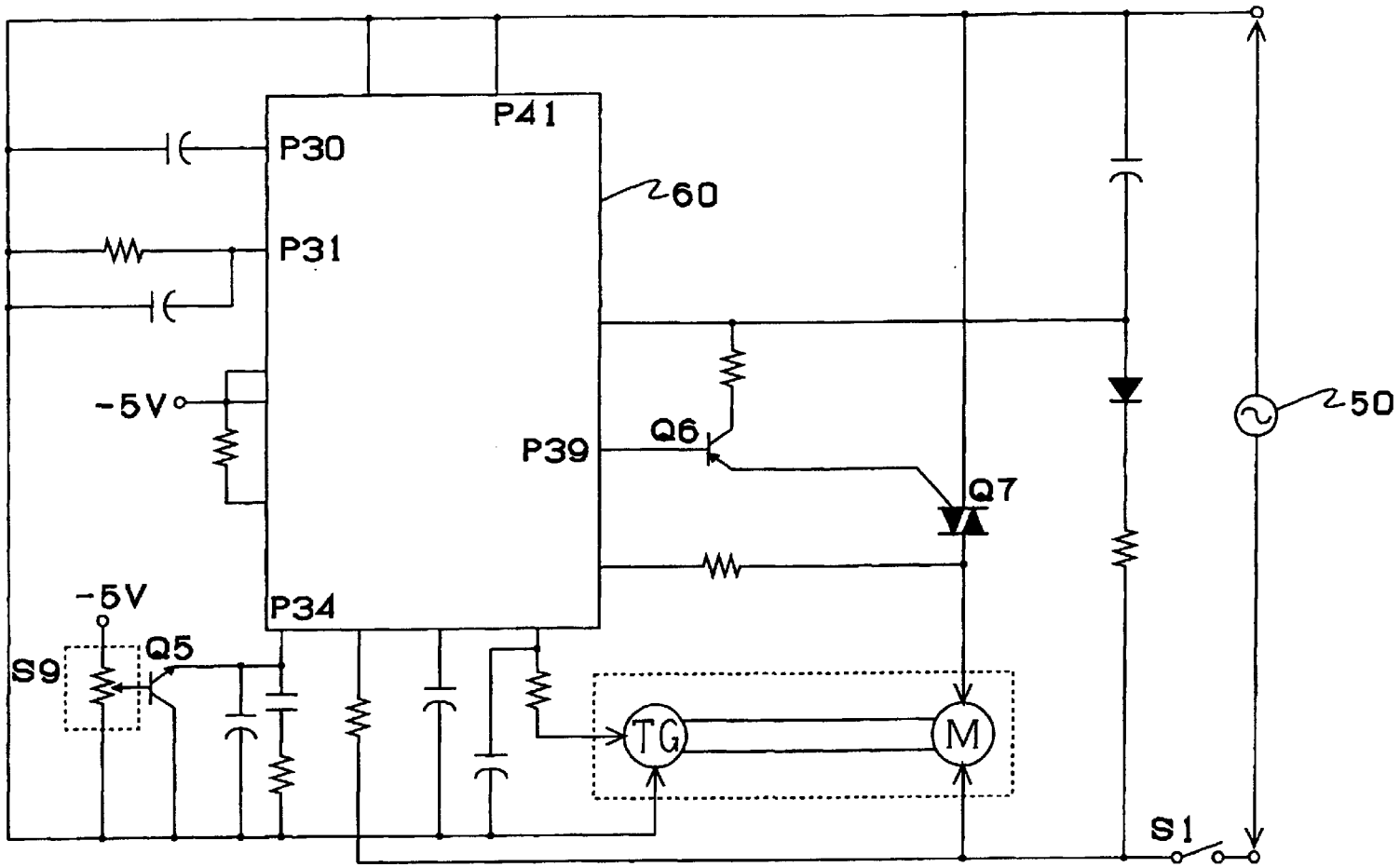
Fig. 6 (Prior Art)
FIG. 6 is an electric circuit diagram of a prior electric motor control circuit.
Figure 7:
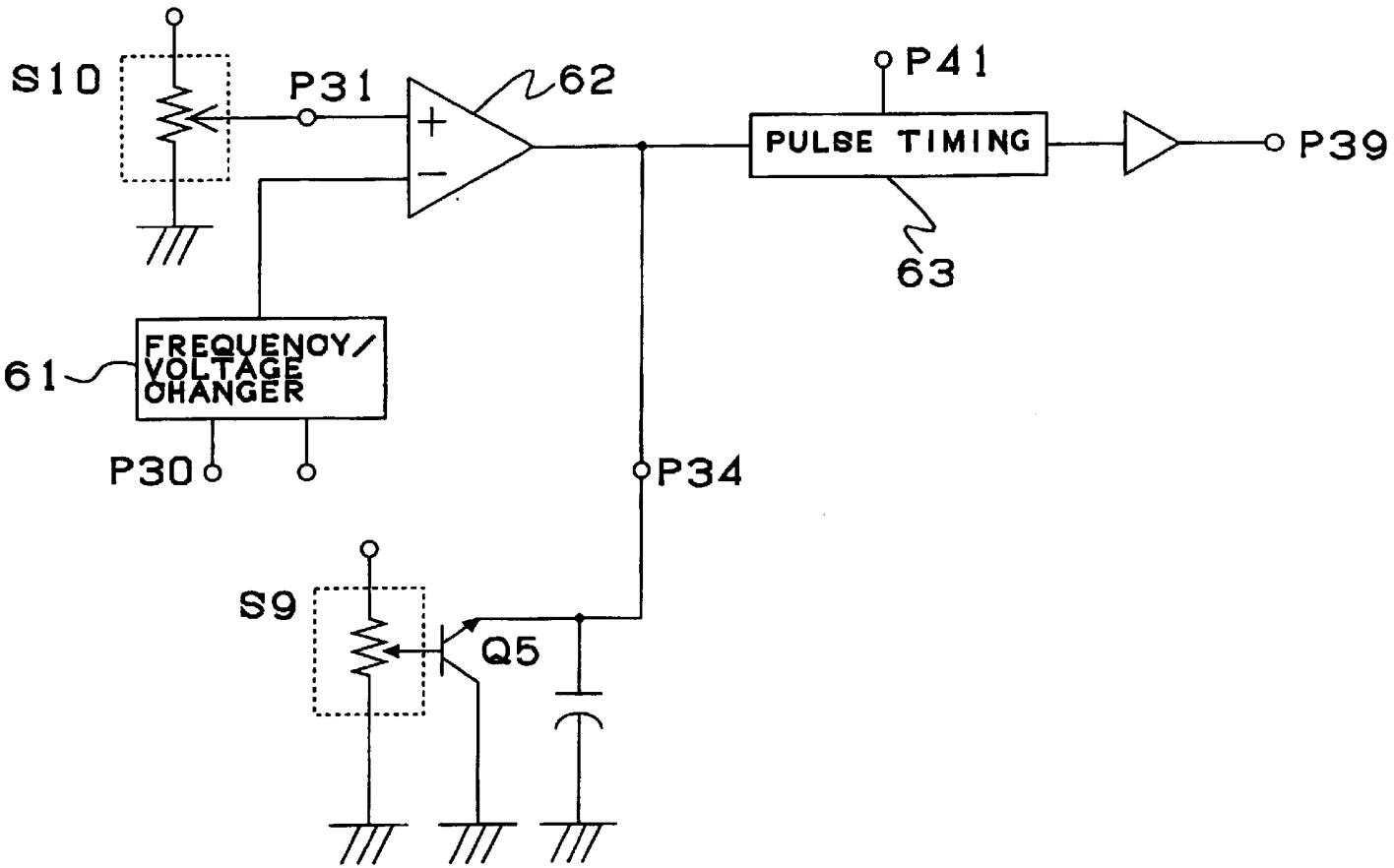
Fig. 7 (Prior Art)
FIG. 7 is an electric circuit diagram of a part of the prior electric motor control circuit shown in FIG. 6.
Figure 8:
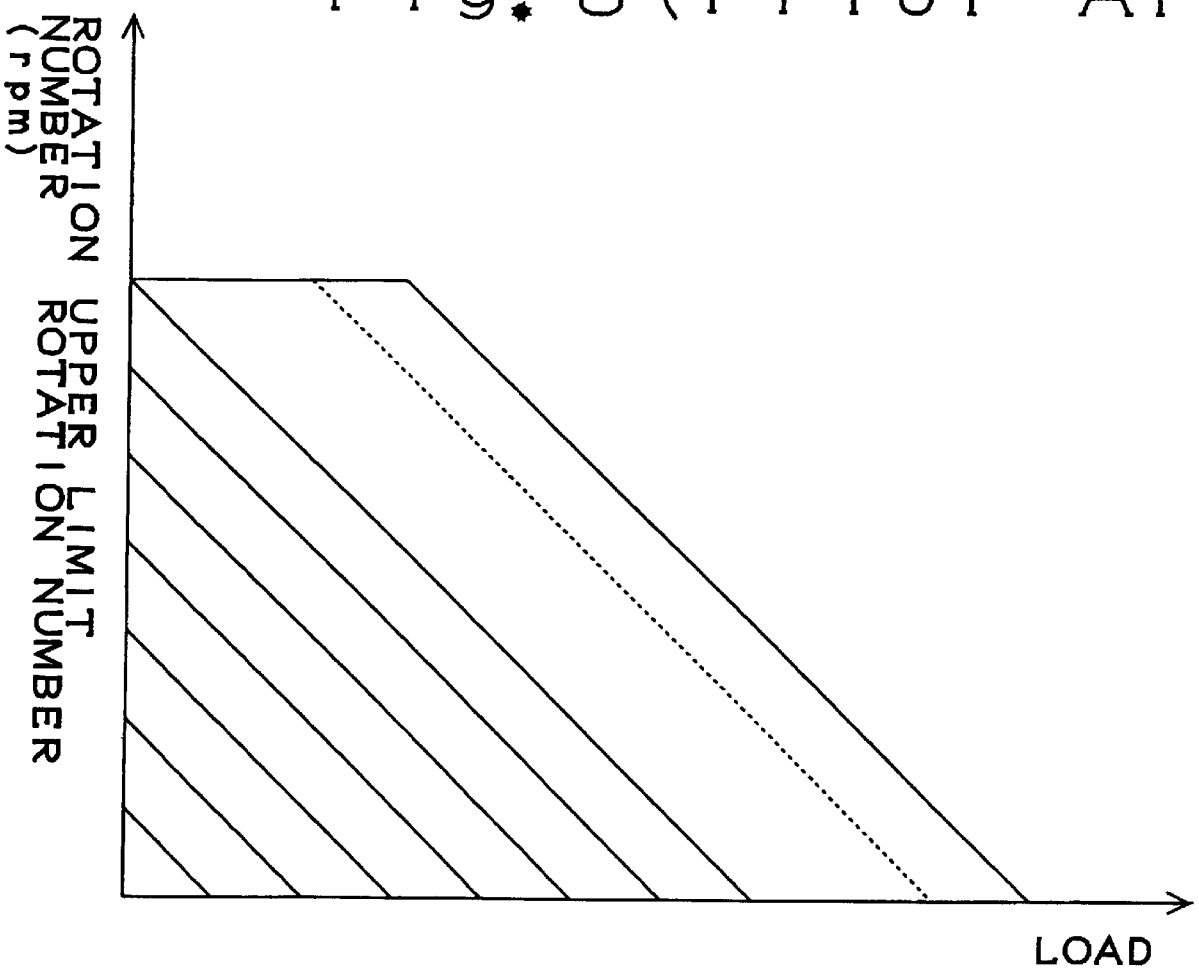
Fig. 8 (Prior Art)
FIG. 8 is a graph showing the relation between a load and the rotation speed of the motor in the prior electric motor control circuit shown in FIG. 6.

FIGS. 5(A), 5(B) show the result of operating this second embodiment of the invention. FIG. 5(A) is a graph showing the relation between a rotation speed N of the motor M and an electric current I flowing through motor M. FIG. 5(B) is a graph showing the relation between the rotation speed N of the motor M and a stroke L of which the trigger is pulled.

As shown in FIG. 5(B), the rotation speed N of the motor M is linearly increased in proportion to the stroke L which the trigger is pulled within the range that does not exceed the upper limit rotation number. In other words, the rotation speed of the motor M can be linearly varied corresponding to the stroke of the trigger. Therefore, the entire trigger stroke can be fully used.

This is especially useful in certain works such as in grinding using a tool such as a sander and a polisher. The finishing condition of the grinding side is rather delicately determined by the rotation speed of the pad for grinding. Therefore, a craftsman wants to change the rotation speed of the motor often. The electric motor control circuit 1 can freely control the rotation speed of the motor M by the operation of the trigger, thereby satisfying this requirement.

Figure 4:
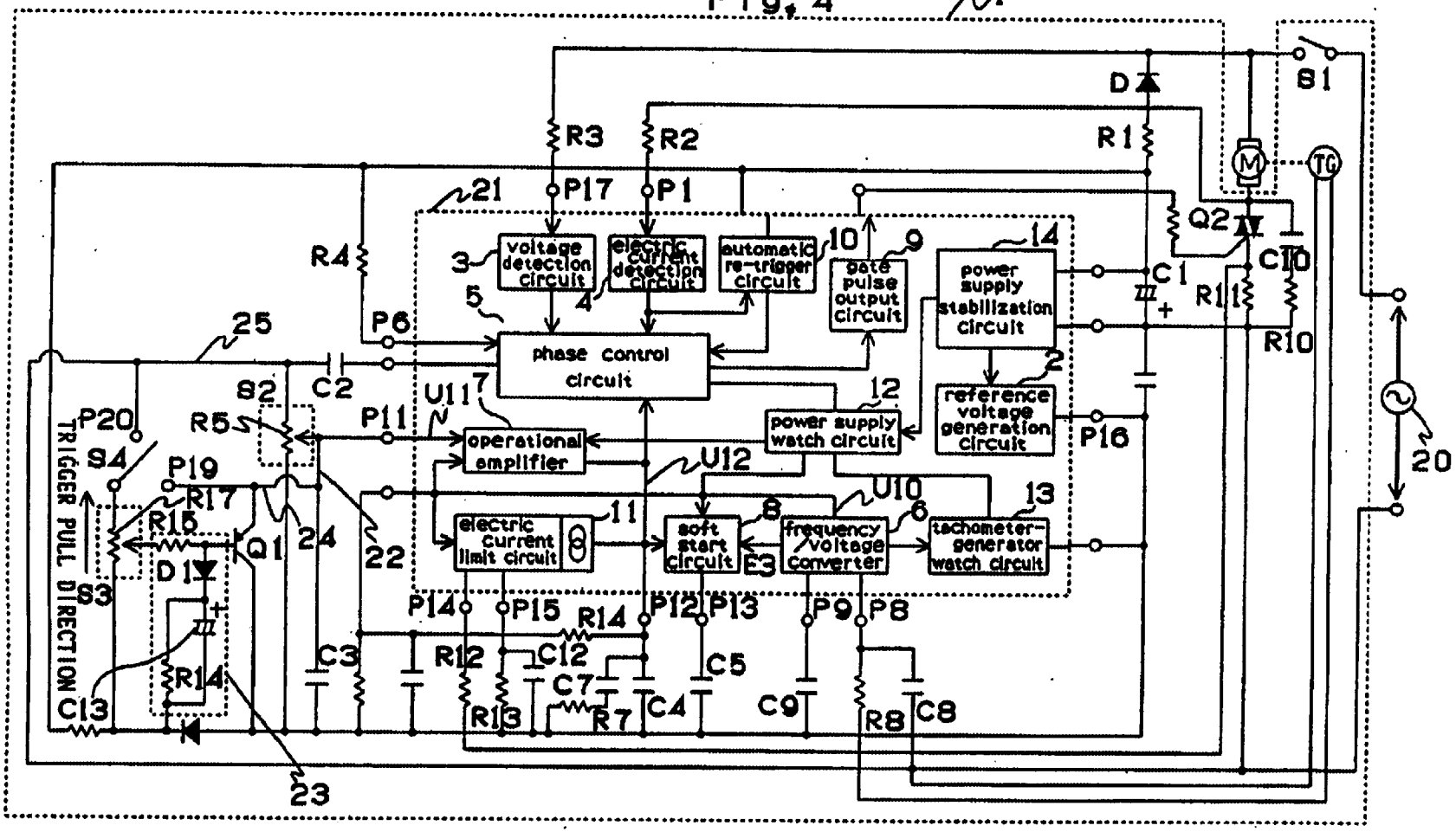
FIG. 4 is an electric circuit diagram of an electric motor control circuit according to a third embodiment of the present invention.

An electric motor control circuit according to a third embodiment of this invention will now be explained with referring to FIG. 4.

The electric motor control circuit of the third embodiment includes a switch arrangement that allows it to operate like either the first embodiment (FIG. 1) or the second embodiment (FIG. 3). As shown in FIG. 4, a switch S4 is provided at one end of trigger switch S3. Switch S4 is connected to allow the top of switch S3 to connect with either terminal P19 or terminal P20. Contact point P19 is connected to bypass way 24 which is connected to bypass way 22. terminal P20 is connected to an electric way 25 which applies a voltage from an interchange power supply 20 to dial switch S2.

When switch S4 is connected to terminal P20, the electric motor control circuit 1 looks like that of the first embodiment. The voltage applied across trigger switch S3 is the same as the voltage applied across dial switch S2. Whereas, when switch S4 connects with terminal P19, circuit 1 looks like that of the second embodiment. The voltage applied across trigger switch S3 is controlled by dial switch S2.

As mentioned above, in the electric motor control circuit of the third embodiment, by operating switch S4, the operating characteristics shown in either FIG. 3(B) or FIG. 5(B) can be chosen.

If the electric motor control circuit of the third embodiment is used in an electromotive tool such as a sander and a polisher, the operator has the ability to switch operating modes at will. During a coarse grinding stage switch S4 can be set to terminal P20 and grinding can be carried out at a constant speed of rotation with the trigger fully pulled.

Whereas during a finishing stage requiring delicate adjustment of rotation speed, switch S4 can be made to terminal P19, allowing fine adjustment of rotation speed based on trigger pull.

Using the third embodiment, if it is not desirable to allow mode switching of the tool, switch S4 can be implemented utilizing a dip-switch that is set at the time the tool is manufactured so as to allow for operation in only one of the modes depending upon the intended use of the tool.

In each embodiment, circuit 23 is connected to the base of the transistor Q1. Circuit 23 however may be omitted for the purpose of preventing the decline of the rotation speed when the load is applied. Further, in each above-described embodiment, the electric motor control circuit applied to the electromotive tool is explained only as a representative example. The electric motor control circuit of this invention also can be applied to a machine tool as well, or to other tools.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments, but should be determined by reference to the claims that follow.

What is claimed is:

1. A control circuit for controlling an electric motor comprising:

rotational speed detection means for detecting a rotational speed of the electric motor and producing a detected speed signal in response thereto;

pulse signal generating means for providing a pulse signal;

a semiconductor control element having (i) a first input for receiving the pulse signal, (ii) a second input for receiving a speed comparison signal, and (iii) an output for providing a rotational speed adjustment signal to the electric motor based upon the speed comparison signal and the pulse signal, the rotational speed adjustment signal for maintaining the rotational speed of the motor at a predetermined level;

rotational speed selection means for receiving a selected speed value as an input and producing a selected speed signal in response thereto;

upper limit speed setting means for (i) selecting an upper limit to the rotational speed, and (ii) producing a setting signal as an output, the setting signal being representative of the upper limit and responsive to the selected speed signal;

wherein the rotational speed selection means adjusts a signal level of the setting signal output from the upper limit speed setting means; and comparison means for comparing the detected speed signal with the setting signal and producing the speed comparison signal as an output thereby.

2. An electric motor control circuit according to claim 1, wherein the rotational speed selection means comprises:

a variable resistor; and a transistor having a base connected to the variable resistor, the transistor controlling the setting signal.

3. An electric motor control circuit according to claim 2, further comprising switching means for adjusting a voltage applied to the variable resistor, the voltage applied to the variable resistor being equivalent to a voltage across a variable resistor of the upper limit speed setting means.

4. An electric motor control circuit according to claim 2, further comprising a delay circuit for delaying an increase in a base voltage of the transistor.

5. An electric motor control circuit according to claim 4, further comprising switching means for adjusting a voltage applied to the variable resistor, the voltage applied to the variable resistor being equivalent to a voltage across a variable resistor of the upper limit speed setting means.

*6. A control circuit for controlling an electric motor powered by an alternating current (AC) power source comprising:*

*a voltage detector coupled to the AC power source, said voltage detector generating a wave signal synchronized with the AC power source;*

*a speed sensor detecting a rotational speed of the electric motor and generating a voltage signal in response thereto;*

*a variable voltage source;*

*an operational amplifier having a first input coupled to said speed sensor, a second input coupled to said variable voltage source, said operational amplifier generating a speed comparison signal, and an output;*

*a driving circuit having a first input coupled to said voltage detector, a second input coupled to the output of said operational amplifier, and an output, said driving circuit generating a pulse signal at the output based upon said speed comparison signal, said pulse signal comprising a rotational speed adjustment signal for maintaining the rotational speed of the motor at a predetermined level; and*

*a semiconductor control element having a gate coupled to the output of said driving circuit and a conduction path coupled in series with the electric motor and the AC power source, said gate receiving said pulse signal such that said semiconductor control element maintains the rotational speed of the motor at a predetermined level.*

*7. The control circuit of claim 6, said voltage detector generating a sawtooth wave signal synchronized with the AC power source.*

*8. The control circuit of claim 6, said speed sensor comprising:*

*a tachometer coupled to the electric motor, said tachometer sensing the rotational speed of the electric motor and generating a frequency signal in response thereto; and*

*a signal converter coupled to said tachometer and generating the voltage signal in response to the frequency signal.*

*9. The control circuit of claim 6, said variable voltage source comprising:*

*an upper limit voltage setting element setting an upper limit voltage level; and*

*a voltage adjusting element adjusting an output voltage of said variable voltage source within a range up to the upper limit voltage level.*

*10. The control circuit of claim 6, said driving circuit comprising:*

*a comparison circuit comparing an output signal of said operational amplifier and the wave signal of said voltage detector and generating a phase signal; and*

*a pulse circuit generating the pulse signal in response to the phase signal.*

*11. The control circuit of claim 6, said semiconductor control element driving the electric motor in response to the pulse signal at the gate of said semiconductor control element.*

*12. A method for controlling an electric motor comprising:*

*generating a wave signal having a phase shift from an alternating current (AC) power source;*

*setting a voltage level;*

*sensing a rotational speed of the electric motor;*

*generating a speed comparison signal based upon said voltage level and said rotational speed;*

*generating a voltage signal in response to the voltage level and the speed comparison signal;*

*generating a pulse signal in response to the voltage signal and the wave signal, said pulse signal comprising a*

*rotational speed adjustment signal for maintaining the rotational speed of the motor at a predetermined level; and*

*driving the electric motor by transmitting the pulse signal to a gate of a semiconductor switching element coupled in series with the electric motor and the AC power source, said gate receiving said pulse signal such that said semiconductor control element maintains the rotational speed of the electric motor at a predetermined level.*

*13. The method as claimed in claim 12, the step of generating a wave signal further comprising generating a sawtooth wave signal.*

*14. The method as claimed in claim 12, the step of setting a voltage level further comprising:*

*setting an upper limit voltage level to select a maximum speed of the electric motor; and*

*adjusting the voltage level within a range up to the upper limit voltage level to adjust the rotational speed of the electric motor up to the maximum speed.*

*15. The method as claimed in claim 12, the step of generating said speed control signal further comprising:*

*generating a frequency signal having a frequency determined in accordance with the rotational speed of the electric motor; and*

*converting the frequency signal to a voltage signal as the feedback signal.*

*16. The method as claimed in claim 12, the step of generating a pulse signal further comprising:*

*generating a phase signal by comparing the voltage signal and the wave signal; and*

*generating the pulse signal in response to the phase signal.*

*17. The method as claimed in claim 12, the step of generating a pulse signal further comprising:*

*increasing a stroke length of the pulse signal in response to the voltage level set at a higher level; and*

*decreasing the stroke length of the pulse signal in response to the voltage level set at a lower level.*

*18. The method as claimed in claim 12, the step of generating a pulse signal further comprising:*

*increasing a stroke length of the pulse signal in response to a decreasing rotational speed of the electric motor; and*

*decreasing the stroke length of the pulse signal in response to an increasing rotational speed of the electric motor.*

*19. The method as claimed in claim 12, the step of driving the electric motor further comprising establishing a conduction path under the gate of the semiconductor switching element in response to the pulse signal.*

*20. An electric motor system powered by an alternating current (AC) power source, comprising:*

*an electric motor;*

*a voltage detector coupled the AC power source and generating a sawtooth wave signal synchronized with the AC power source;*

*a speed sensor detecting a rotational speed of the electric motor and generating voltage signal in response thereto;*

*a voltage source having a first element setting an upper limit of a voltage level and a second element adjusting the voltage level up the upper limit;*

*a comparison circuit having a first input coupled to said speed sensor, a second input coupled to said voltage source, and an output, said output of said comparison circuit comprising a speed comparison signal;*

*a driving circuit having a first input coupled to said voltage detector, a second input coupled to the output of said comparison circuit and receiving said speed comparison signal, and an output, said driving circuit generating a pulse signal at the output, said pulse signal comprising a rotational speed adjustment signal for maintaining the rotational speed of the motor at a predetermined level; and*

*a semiconductor control element having a gate coupled to the output of said driving circuit and a conduction path coupled in series with said electric motor and the AC power source, said gate receiving said pulse signal such that said semiconductor control element maintains the rotational speed of the electric motor at a predetermined level.*

*21. The electric motor system of claim 20, wherein said semiconductor control element drives the electric motor in response to the pulse signal at the gate of said semiconductor control element.*

*22. The electric motor system of claim 20, wherein said speed sensor comprises:*

*a tachometer coupled to said electric motor, said tachometer sensing the rotational speed of said electric motor and generating a frequency signal having a frequency determined in accordance with the rotational speed of said electric motor; and*

*a signal converter coupled to said tachometer and converting the voltage signal to the frequency signal.*

*23. The electric motor system of claim 20, wherein said driving circuit comprises:*

*a phase control circuit comparing an output signal of said comparison circuit and the wave signal of said voltage detector and generating a phase signal; and*

*a pulse circuit coupled to said phase control circuit, said pulse circuit generating the pulse signal in response to the phase signal.*

*24. The electric motor system of claim 20, wherein:*

*said speed sensor and said comparison circuit generate a speed comparison signal; and*

*said driving circuit and said semiconductor control element maintain a stable rotational speed of said electric motor under various load conditions in response to an output voltage of said voltage source and the feedback signal.*

*25. An apparatus for controlling an electric motor comprising:*

*means for generating a wave signal having a phase shift from an alternating current (AC) power source;*

*means for setting a voltage level;*

*means for sensing a rotational speed of the electric motor;*

*means for generating a feedback signal in response to said rotational speed of the electric motor and said voltage level;*

*means for generating a speed comparison signal in response to the voltage level and the feedback signal;*

*means for generating a pulse signal in response to the speed comparison signal and the wave signal, said pulse signal comprising a rotational adjustment signal for maintaining the rotational speed of the motor at a predetermined level; and*

*means for driving the electric motor by transmitting the pulse signal to a gate of a semiconductor switching*

*element coupled in series with the electric motor and the AC power source, said gate receiving said pulse signal such that said semiconductor control element maintains the rotational speed of the electric motor at a predetermined level.*

*26. The apparatus of claim 25 wherein said means for generating a wave signal further comprises a means for generating a sawtooth wave signal.*

*27. The apparatus of claim 25 wherein said means for setting voltage level further comprises:*

*means for setting an upper limit voltage level to select a maximum speed of the electric motor; and means for adjusting the voltage level within a range up to the upper limit voltage level to adjust the rotational speed of the electric motor up to the maximum speed.*

*28. The apparatus of claim 25 wherein said means for generating a feedback signal further comprises:*

*means for generating a frequency signal having a frequency determined in accordance with the rotational speed of the electric motor; and*

*means for converting the frequency signal to a voltage signal as the feedback signal.*

*29. The apparatus of claim 25 wherein said means for generating a pulse signal further comprises:*

*means for generating a phase signal by comparing the speed comparison signal and the wave signal; and*

*means for generating the pulse signal in response to the phase signal.*

*30. The apparatus of claim 25 wherein said means for generating a pulse signal further comprises:*

*means for increasing a stroke length of the pulse signal in response to the voltage level set at a higher level; and*

*means for decreasing the stroke length of the pulse signal in response to the voltage level set at a lower level.*

*31. The apparatus of claim 25 wherein said means for generating a pulse signal further comprises:*

*means for increasing a stroke length of the pulse signal in response to a decreasing rotational speed of the electric motor; and*

*means for decreasing the stroke length of the pulse signal in response to an increasing rotational speed of the electric motor.*

*32. The apparatus of claim 25 wherein said means for driving the electric motor further including establishing a conduction path under the gate of the semiconductor switching element in response to the pulse signal.*

* * * * *